(12) United States Patent
Tajima et al.

(10) Patent No.: US 6,377,018 B2
(45) Date of Patent: Apr. 23, 2002

(54) SPEED SENSORLESS VECTOR CONTROL APPARATUS

(75) Inventors: Hirokazu Tajima, Mie; Hidetoshi Umida, Kanagawa, both of (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/800,258

(22) Filed: Mar. 6, 2001

(30) Foreign Application Priority Data

Mar. 10, 2000  (JP) ........................................ 2000-072482

(51) Int. Cl.$^7$ ................................................ H02P 5/28
(52) U.S. Cl. ........................ 318/727; 318/800; 318/801; 318/803; 318/805; 318/807
(58) Field of Search ................................. 318/727, 805, 318/807, 803, 800, 801

(56) References Cited

U.S. PATENT DOCUMENTS

| | | | |
|---|---|---|---|
| 5,585,709 A | * 12/1996 | Jansen et al. | 318/807 |
| 5,811,957 A | * 9/1998 | Bose et al. | 318/802 |
| 5,861,728 A | * 1/1999 | Tazawa et al. | 318/778 |
| 5,959,429 A | * 9/1999 | Tajima et al. | 318/799 |
| 5,969,498 A | * 10/1999 | Cooke | 318/799 |
| 6,137,258 A | * 10/2000 | Jansen | 318/802 |
| 6,281,659 B1 | * 8/2001 | Giuseppe | 318/799 |

OTHER PUBLICATIONS

H. Kubota, et al.; "Speed sensorless field–oriented control of induction motor with rotor resistance adaptation"; IEEE Transactions on Industry Applications; vol. 30, No. 5, Sep./Oct. 1994; p. 1219–1224.

* cited by examiner

Primary Examiner—Robert E. Nappi
Assistant Examiner—Rita Leykin
(74) Attorney, Agent, or Firm—Greer, Burns & Crain, Ltd.

(57) ABSTRACT

A control apparatus for estimating the flux, the current, and the speed of an AC motor using the current and the voltage, and controlling the vector of an AC motor using the estimated speed, a flux command, and a torque current command. The speed is estimated by adding a product of the deviation between the actual value and the estimated value of a magnetization current, the level of a torque current correspondence value, the sign correspondence value of a primary frequency command value, and a gain to an outer product of an estimated current deviation and an estimated flux. Thus, a stable speed estimating operation can be performed to successfully operate the motor in a low speed area in which a voltage frequency applied to the motor is extremely low.

4 Claims, 4 Drawing Sheets

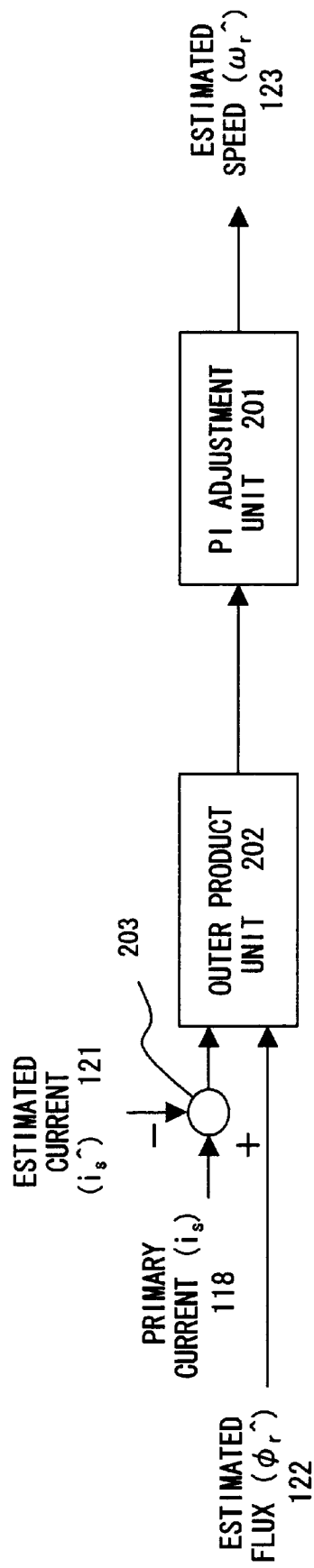
F I G. 2

SPEED SENSORLESS VECTOR CONTROL APPARATUS

BACKGROUND OF THE INVENTION

1. Field of the Invention

The present invention relates to a speed sensorless vector control apparatus capable of controlling the vector of an AC motor such as an induction motor, etc. without a speed sensor.

2. Description of the Related Art

In vector control known as a high-performance and high-precision system of controlling an induction motor, speed information about a motor is required, and is normally obtained by a pulse generator (PG), etc. However, it is desired to realize the speed sensor vector control as a variable speed drive system capable of performing torque control and obtaining the maximum torque in a wide operation range without a necessity of the high performance of the conventional speed sensor vector control at a request to restrict the environment of setting a speed sensor, simplify the wiring, reduce the cost, etc.

FIG. 1 is a block diagram of the function of the conventional speed sensorless vector control apparatus using a common speed adaptive secondary flux observer, and shows the speed sensor vector control of an AC motor 102 such as an induction motor, etc. by combining an inverter 101, a current detection unit 103, current adjustment units 104 and 105, coordinate conversion units 106 and 109, 3 phase to 2 phase conversion units 107 and 108, a current/flux estimation unit 110, and a speed estimation unit 301.

The current/flux estimation unit 110, the speed estimation unit 301, etc. configure the speed adaptive secondary flux observer.

In FIG. 1, a primary current 118 of the AC motor 102 through the 3 phase to 2 phase conversion unit 108 is converted into a d-q axis rotation coordinate component by the coordinate conversion unit 109 with an estimated flux (vector) 122 set as the standard of a rotation coordinate, and then into a torque current ($i_q$) 117 and a magnetization current ($i_d$) 116. The current adjustment units 104 and 105 perform control such that the torque current ($i_q$) 117 and the magnetization current ($i_d$) 116 respectively match a torque current command ($i_q^*$) 113 and a magnetization current command ($1_d^*$) 115. The magnetization current command ($1_d^*$) 115 is computed by a magnetization current command operation unit 112 which receives a flux command ($\Phi^*$) 114.

The coordinate conversion unit 106 generates a primary voltage command 119 by converting the output of the current adjustment units 104 and 105 into a static coordinate system, generating a primary voltage command 119, and providing the generated command for the inverter 101 such as a three-phase voltage type inverter, etc. The inverter 101 performs DC-AC conversion based on the primary voltage command 119, and provides the voltage (primary voltage 120) of each of the three phases for the AC motor 102.

In addition, the primary voltage 120 and a primary current 118 detected by the current detection unit 103 are converted into two components respectively by the 3 phase to 2 phase conversion units 107 and 108. The two-phase component of the primary voltage 120 is input to the current/flux estimation unit 110, the two-phase component of the primary current 118 is input to the current/flux estimation unit 110, the speed estimation unit 301, and the coordinate conversion unit 109.

Described mainly below are the operations by the current/flux estimation unit 110 and the speed estimation unit 301 to explain about the speed estimating operation in the conventional speed sensorless vector control.

First, the principle of the speed sensorless vector control is introduced by:

Document 1: Power and Electric Application Study of Electric Society of Japan, material IEA-91-11, 1991, pp. 41–48 "Speed Adaptive Secondary Flux Observer of an Induction Motor and its Characteristics"

Document 2: IEEE Transaction on Industry Application, Vol. 30, No. 5, September/October 1994, pp. 1219–1224 "Speed Sensorless Field Oriented Control of Induction Motor with Rotor Resistance Adaptation"

Document 3: "Vector Control of AC Motor" (published by Daily Industrial News in 1996, pp. 91–110, Chapter 5 'Speed Sensor Vector Control of Induction Motor'.

According to the above mentioned documents, the speed can be estimated based on the algorithm described below with the configuration shown in FIG. 2 described later.

First, in an example of an induction motor as a motor to be controlled, a state equation can normally be represented by equation 1. The transposed matrix is expressed with the character T added to a matrix as a superscript.

$$d/dt \begin{bmatrix} i_s \\ \phi_r \end{bmatrix} = A \begin{bmatrix} i_s \\ \phi_r \end{bmatrix} + B v_s \quad \text{Equation 1}$$

$$i_s = [i_{s\alpha} \ i_{s\beta}]^T;$$

$$\phi_r = [\phi_{r\alpha} \ \phi_{r\beta}]^T;$$

$$v_s = [v_{s\alpha} \ v_{s\beta}]^T;$$

$$A = \begin{bmatrix} -\left(\frac{R_s}{\sigma L_s} + \frac{1-\sigma}{\sigma \tau_r}\right) I & \frac{L_m}{\sigma L_s L_r}\left(\frac{1}{\tau_r} I - \omega_r J\right) \\ \frac{L_m}{\tau_r} I & -\frac{1}{\tau_r} I + \omega_r J \end{bmatrix};$$

$$B = \begin{bmatrix} \frac{1}{\sigma L_s} & 0 & 0 & 0 \\ 0 & \frac{1}{\sigma L_s} & 0 & 0 \end{bmatrix}^T;$$

$$I = \begin{bmatrix} 1 & 0 \\ 0 & 1 \end{bmatrix};$$

$$J = \begin{bmatrix} 0 & -1 \\ 1 & 0 \end{bmatrix};$$

In the equation 1 above, $i_s$ and $v_s$ indicate the primary current and the primary voltage;

$\phi_r$ indicates the secondary interlinkage flux (secondary flux);

Superscripts $\alpha$ and $\beta$ indicate the orthogonal 2-axis component s of a static coordinate system;

$R_s$ and $R_r$ indicate the primary resistance and the secondary resistance;.

$L_s$, $L_r$, and $L_m$ indicate the primary inductance, the secondary inductance, and the mutual inductance respectively;

$\tau_r = L_r/R_r$ indicates the secondary time constant;

$\sigma = 1 - L_m^2/(L_s L_r)$ indicates a leakage coefficient; and $\omega_r$ indicates a rotor angular speed.

The equation 1 indicates the relationship between the primary voltage $v_s$ as an input to a control target and the primary current is and the secondary flux $\phi_r$ as outputs. If the primary voltage $v_s$ is provided, the primary current $i_s$ and the secondary flux $\phi_r$ can be computed.

A model in which the above mentioned deviation can be input to a simulator such that there is no deviation between an output of a control target which can be measured and an estimated output value of the simulator is referred to as a same dimensional observer. According to the principle of the observer, the current/flux estimation unit 110 computes the estimated value $\hat{i}_s$ of the primary current (an estimated current 121 shown in FIG. 1) and the estimated value $\hat{\phi}_r$ of the secondary flux (an estimated flux 122) by equation 2. In the following descriptions, "^" indicates an estimated value.

$$d/dt \begin{bmatrix} \hat{i}_s \\ \hat{\phi}_r \end{bmatrix} = \hat{A} \begin{bmatrix} \hat{i}_s \\ \hat{\phi}_r \end{bmatrix} + Bv_s + G(\hat{i}_s - i_s) \quad \text{Equation 2}$$

In the equation 2 above,

G indicates a gain matrix (optional matrix for determination of the dynamic characteristic of an observer).

A matrix $\hat{A}$ is obtained by replacing the angular speed $\omega_r$ in the matrix A in the equation 1 with the estimated speed $\hat{\omega}_r$.

In the equation 2 above, when the rotor angular speed changes, there arises deviation between the output (primary current estimated value) of the simulator (equation model) and the actual primary current. Thus, the speed adaptive secondary flux observer estimates the secondary flux $\phi_r$ while estimating and adapting the angular speed $\omega_r$ using the function of the current deviation $(i_s - \hat{i}_s)$.

The speed adaptive secondary flux observer can be configured as expressed by equation 3 described later by adding the adaptive estimation mechanism of the angular speed as an unknown parameter to the observer expressed by the equation 2, and can be embodied by the speed estimation unit 301 shown in FIG. 1 obtaining an estimated speed 123 from the estimated current 121, the primary current 118, and the estimated flux (vector) 122.

That is, as shown in FIG. 2 of an embodiment of the speed estimation unit 301 shown in FIG. 1, an outer product unit 202 obtains an outer product of the current deviation $(i_s - \hat{i}_s)$ obtained by an addition/subtraction unit 203 and the estimated flux $(\hat{\phi}_r)$ 122, and the speed estimation unit 301 provides the outer product to a PI adjustment unit 201, and obtains the estimated speed $(\hat{\omega}_r)$ 123.

That is, the estimated speed $\hat{\omega}_r$ is computed by the following equation 3. The symbol x in the equation 3 indicates an outer product.

$$\hat{\omega}_r = (k_{p\omega} + k_{i\omega}/p)\{(i_s - \hat{i}_s) \times \hat{\phi}_r\} = (k_{p\omega} + k_{i\omega}/p)\{(i_{s\alpha} - \hat{i}_{s\alpha})\hat{\phi}_{r\beta} - (i_{s\beta} - \hat{i}_{s\beta})\hat{\phi}_{r\alpha}\} \quad \text{Equation 3}$$

p=d/dt

In the equation 3 above, $k_{p\omega}$ and $k_{i\omega}$ indicate a proportional gain and an integral gain respectively;

$i_{s\alpha}$, $\hat{i}_{s\alpha}$, $i_{s\beta}$, and $\hat{i}_{s\beta}$ indicate the orthogonal 2-axis component in the static coordinate system of the primary current is and the estimated current $\hat{i}_s$; and $\hat{\phi}_{r\alpha}$ and $\hat{\phi}_{r\beta}$ indicate the orthogonal 2-axis component in the static coordinate system of the estimated flux $\hat{\phi}_r$.

The estimated speed $\hat{\omega}_r$ thus obtained as described above is used in an arithmetic operation of the deviation between the speed and the speed target value $\omega_r^*$ not shown in FIG. 1, the deviation is input to a speed adjustment unit, and a torque current command 113 is generated.

In the above mentioned conventional speed estimating method, when the voltage applied to the motor and the frequency of the current are considerably low (frequency of 0 in an extreme example), the induction reactance of the motor logically approaches zero, and the voltage of the inductance approaches zero regardless of the current. Therefore, the secondary flux cannot be computed from the primary voltage, and the estimated flux or the estimated speed cannot be computed, either. That is, the deviation between an estimated flux and its actual value, and the deviation between an estimated speed and its are not equal to zero, and do not successfully converge.

Generally speaking, since it is difficult to stably estimate the speed in an area in which the frequency of the voltage applied to a motor is extremely low, there has been the problem with the conventional technology that a motor cannot be operated by speed sensorless vector control. That is, since there is a lower limit for the output frequency of the sensorless vector control-apparatus using an inverter, there has been a request to extend the range of speed control in the above mentioned low speed area.

SUMMARY OF THE INVENTION

To solve the above mentioned problems, the present invention aims at providing the speed sensorless vector control apparatus capable of operating a motor without its any trouble by successfully performing a stable speed estimation even in a low speed area in which the frequency of a voltage applied to the motor is extremely low.

The speed sensorless vector control apparatus according to the present invention includes a current/flux operation unit, a coordinate conversion unit, a current adjustment unit, a coordinate conversion unit, an inverter for driving an AC motor, and a speed estimation unit.

According to the first aspect of the present invention, the current/flux operation unit computes the primary current estimated value (hereinafter referred to as an estimated current) and the secondary flux estimated value (hereinafter referred to as an estimated flux) from the primary current, the primary voltage, and the estimated speed of the AC motor without a speed sensor. The coordinate conversion unit converts the primary current into a torque current and a magnetization current with the estimated flux vector set as the reference of a rotation coordinate. The current adjustment unit adjusts the torque current and the magnetization current such that they match respective commands. The coordinate conversion unit generates the primary voltage command by converting the coordinates of the output signal of the current adjustment unit with the estimated flux vector set as the reference of a rotation coordinate. The inverter for driving an AC motor is operated at the primary voltage command. The speed estimation unit receives an estimated current, an estimated flux, a primary current, a torque current, a magnetization current, and a primary frequency command value, and adds a product of the magnetization current deviation between the actual value of the magnetization current and the estimated value, the size of a torque current correspondence value, the sign correspondence value of the primary frequency command value, and the gain to the outer product of the estimated current deviation between the primary current and the estimated current and the estimated flux, thereby computing the estimated value of the speed of the motor.

BRIEF DESCRIPTION OF THE DRAWINGS

FIG. 2 is a block diagram of a practical example of the speed estimation unit shown in FIG. 2;

DETAILED DESCRIPTION OF THE PREFERRED EMBODIMENTS

To solve the above mentioned problems, the invention according to claim 1 comprises:

current/flux operation means for computing an estimated current and an estimated flux from the primary current, the primary voltage, and the estimated speed of an AC motor without a speed sensor;

coordinate conversion means for converting a primary current into a torque current and a magnetization current with an estimated flux vector set as a reference of a rotation coordinate;

current adjustment means for adjusting a torque current and a magnetization current such that they match respective commands;

coordinate conversion means for generating a primary voltage command by converting the coordinates of an output signal of the current adjustment means with an estimated flux vector set as a reference of a rotation coordinate;

an inverter for driving an AC motor operated at the primary voltage command; and speed estimation means for receiving an estimated current, an estimated flux, a primary current, a torque current, a magnetization current, and a primary frequency command value, and computing the estimated value of the speed of the motor. The speed estimation means adds a product of the magnetization current deviation between the actual value of the magnetization current and the estimated value, the size of a torque current correspondence value, the sign correspondence value of the primary frequency command value, and the gain to the outer product of the estimated current deviation between the primary current and the estimated current and the estimated flux, thereby computing the estimated value of the speed of the motor.

The torque current correspondence value can be a torque current estimated value or a torque current actual value as described in claim 2 or 3.

The embodiment of the present invention is described below by referring to the attached drawings.

Figure 1:
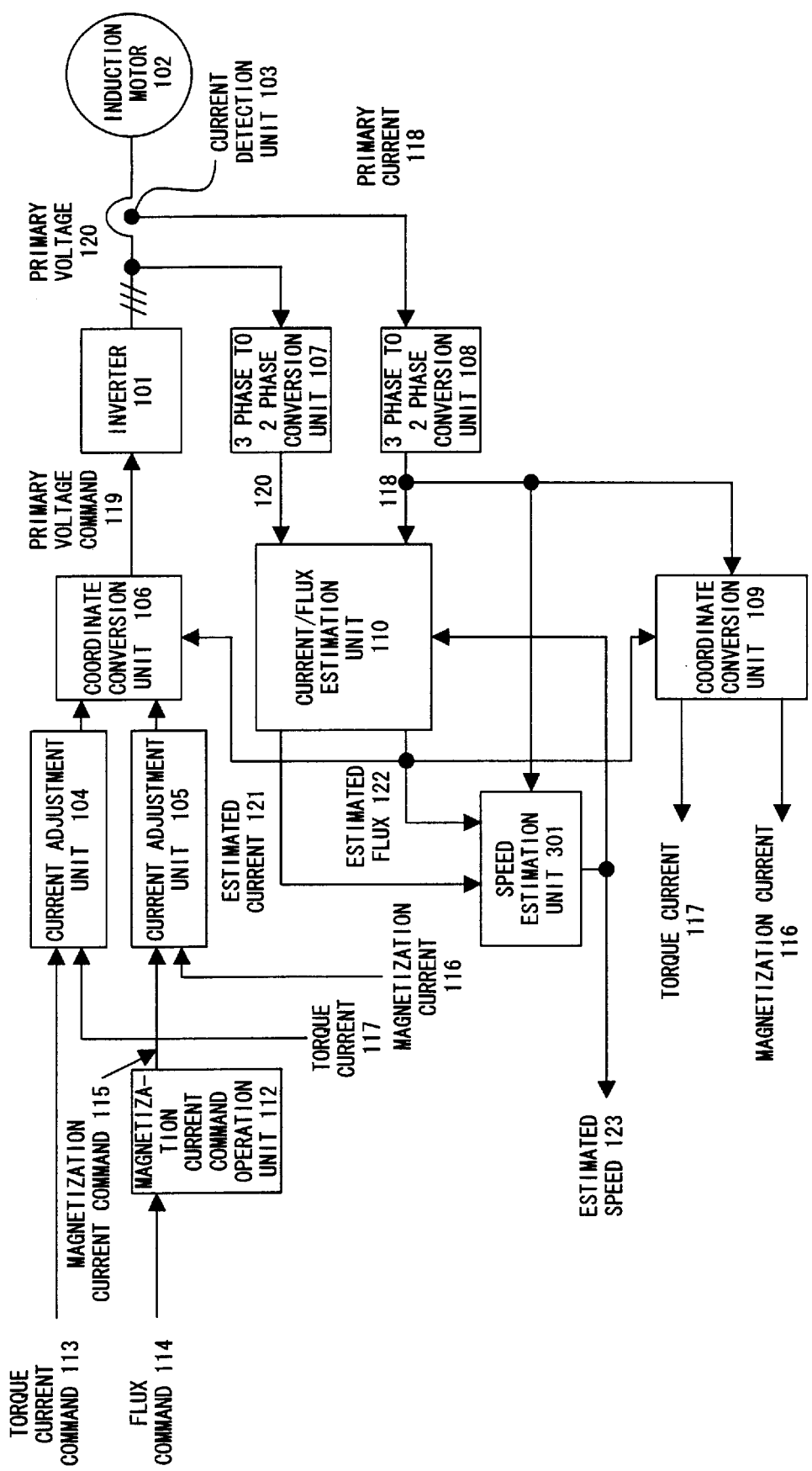
FIG. 1 is a control block diagram of the conventional technology.
Figure 3:
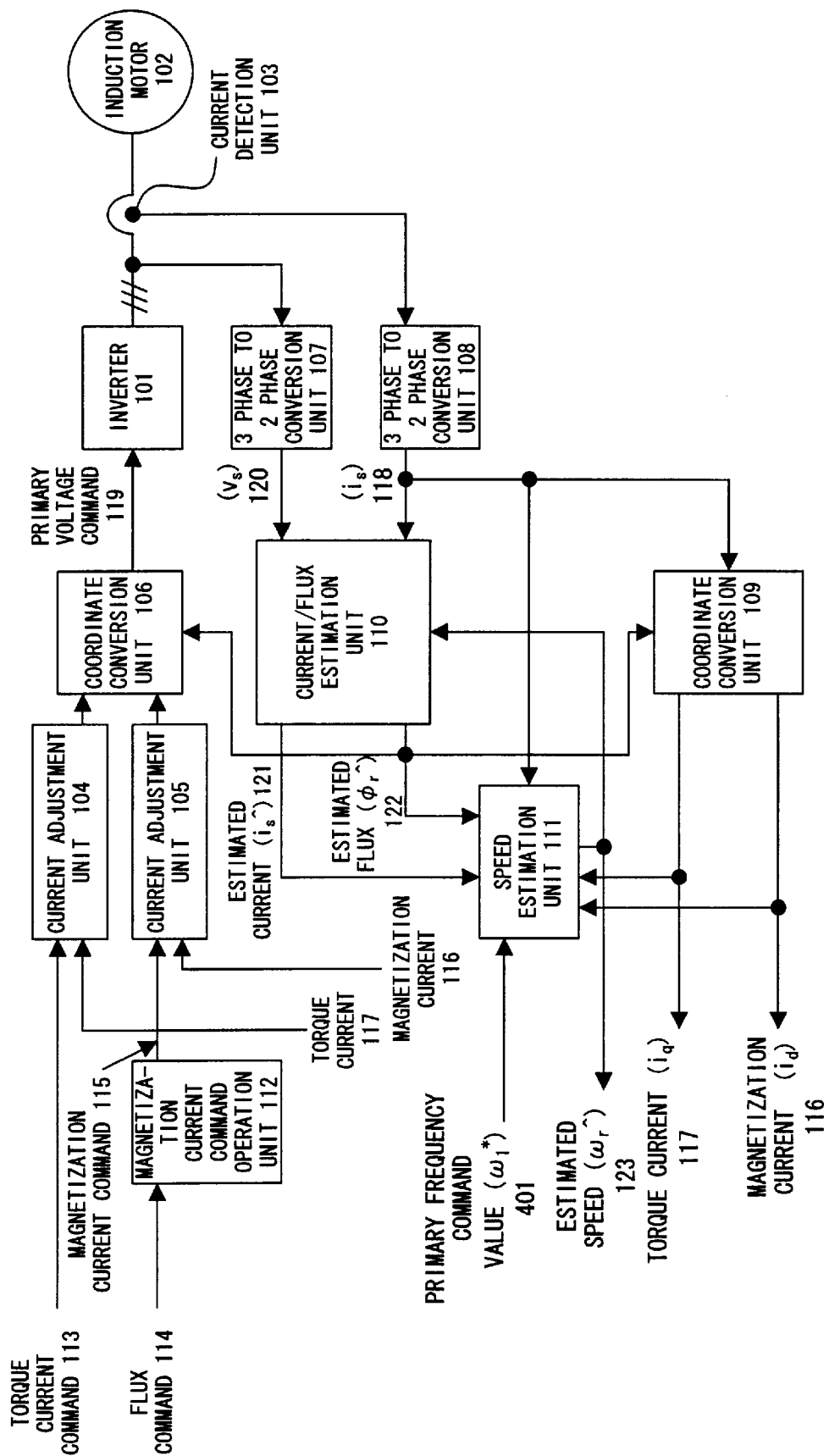
FIG. 3 is a control block diagram of an embodiment of the present invention.

FIG. 3 is a control block diagram of an embodiment of the present invention. The difference from the block diagram shown in FIG. 1 if the configuration of a speed estimation unit 111. The speed estimation unit 111 further receives a primary frequency command value ($\omega_1^*$) 401, a magnetization current ($i_d$) 116, and a torque current ($i_q$) 117. Other units are the same as those shown in FIG. 1. Therefore, the same reference numerals as those shown in FIG. 1 are assigned, and the explanation is omitted here.

Figure 4:
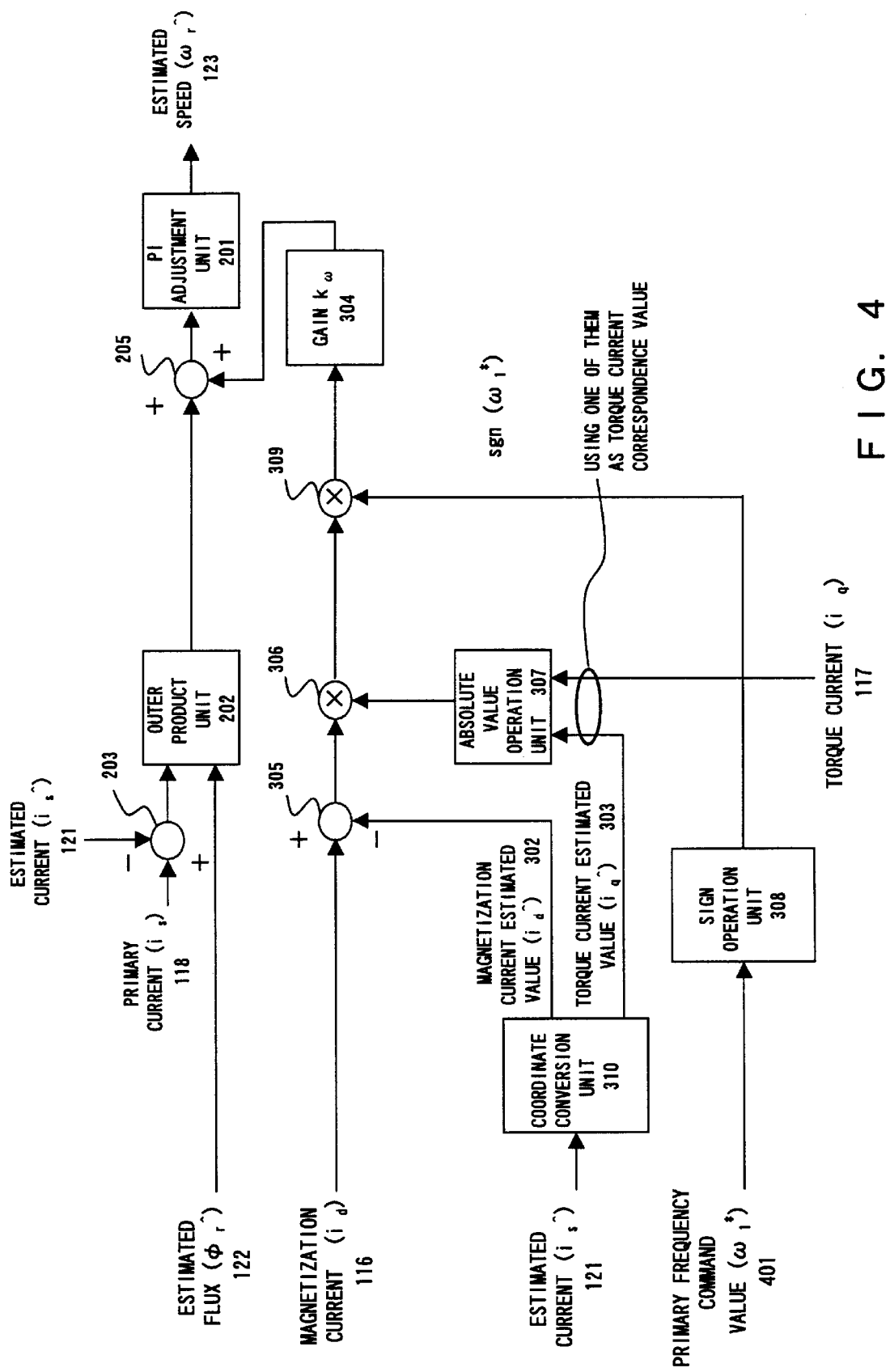
FIG. 4 is a block diagram of a practical example of the speed estimation unit shown in FIG. 3.

FIG. 4 shows the internal configuration of the speed estimation unit 111.

The configuration is described below by referring to FIG. 2. As compared with FIG. 2, the configuration shown in FIG. 4 further comprises addition/subtraction units 205 and 305, multiplication units 306 and 309, a gain element 304, an absolute value operation unit 307, a sign operation unit 308, and a coordinate conversion unit 310.

That is, according to the present embodiment, the following operations are performed in addition to the outer product operation of the current deviation ($i_s - i_s^\wedge$) and the estimated flux $\omega_r^\wedge$ performed by the outer product unit 202 shown in FIG. 2, and the PI operation performed by the PI adjustment unit 201 on the output of the outer product operation., That is, in FIG. 4, the coordinate conversion unit 310 converts coordinates based on the estimated flux ($\phi_r^\wedge$) 122, separates the estimated current ($i_s^\wedge$) 121 into a magnetization current estimated value ($i_d^\wedge$) 302 and a torque current estimated value ($i_q^\wedge$) 303, and outputs the result.

Then, the addition/subtraction unit 305 obtains the deviation ($i_d - i_d^\wedge$) between the actual magnetization current ($i_d$) 116 and the magnetization current estimated value ($i_d^\wedge$) 302, and the multiplication unit 306 multiplies the deviation by the torque current estimated value ($i_q^\wedge$) 303 obtained by the absolute value operation unit 307 or the absolute value of the torque current actual value ($i_q$) 117.

In FIG. 4, the absolute value operation unit 307 in the speed estimation unit 111 receives the torque current actual value ($i_q$) 117 to match FIG. 4 with FIG. 3, and only has to compute the absolute value using one of the torque current estimated value ($i_q^\wedge$) 303 and the torque current actual value ($i_q$) 117.

Furthermore, the multiplication unit 309 multiplies the sign correspondence value sgn ($\omega_1^*$) of a primary frequency command value ($\omega_1^*$) 401 obtained. by the sign operation unit 308 by the output of the multiplication unit 306, the gain element 304 multiplies the output by $k_\omega$, and the addition/subtraction unit 205 adds the output to the output of the outer product unit 202. Then, the output of the addition/subtraction unit 205 is input to the PI adjustment unit 201, and the estimated speed ($\omega_r^\wedge$) 123 is obtained.

That is, according to the present embodiment, the magnetization current deviation ($i_d - i_d^\wedge$) is amplified depending on the value corresponding to the level of the torque, the sign of the output signal is adjusted depending on the rotation direction of a motor, and the addition/subtraction unit 205 adds a correction signal obtained by multiplication by a gain kw to the output signal of the outer product unit 202, and inputs the result to the PI adjustment unit 201.

When the actual speed ($\omega_r$) of the AC motor 102 matches the estimated speed ($\omega_r^\wedge$) 123, the direction of the actual flux vector of the AC motor 102 matches the direction of the estimated flux vector, and the magnetization current estimated value ($i_d^\wedge$) 302 matches the actual magnetization current ($i_d$) 116. As a result, the output of the addition/subtraction unit 305 is zero, and the output of the gain element 304 is also zero. Therefore, the configuration shown in FIG. 4 is practically the same as that of the conventional technology shown in FIG. 2.

However, when the actual speed of the AC motor 102 does not match the estimated speed 123 in a low speed area in which the voltage-frequency applied to the AC motor 102 is nearly zero, the direction of the flux vector of the AC motor 102 does not match the direction of the estimated flux vector, thereby causing the deviation depending on the different angle of the flux vector between the magnetization current estimated value 302 and the magnetization current 116.

The speed estimation unit 111 generates a correction signal for the magnetization current deviation ($i_d - i_d^\wedge$) with the level of the torque and the rotation direction of a motor taken into account, and the correction signal is added to the outer product of the estimated current deviation and the estimated flux. Based on the resultant signal, the estimated speed ($\omega_r^\wedge$) 123 is computed.

That is, the speed estimation unit 111 shown in FIG. 4 computes the estimated speed 123 by equation 4 instead of the equation 3 above, and the magnetization current estimated value 302 performs feedback control to suppress dispersion on the magnetization current 116, thereby matching the estimated speed 123 with the actual speed.

The equation 4 is an example in which the absolute value operation unit 307 shown in FIG. 4 selects an absolute value $|i_q|$ of the torque current actual value, and multiplies it by the magnetization current deviation $(i_s - \hat{i}_s)$. However, as described above, the absolute value $|i_q|$ of the torque current actual value can be replaced with the absolute value $|i_q|$ of the torque current estimated value.

$$\hat{\omega}_r = (k_{p\omega} + k_{i\omega}/p)[\{(i_s - \hat{i}_s) \times \hat{\phi}_r\} + k_\omega \cdot \text{sgn}(\omega_1^*) \cdot \quad \text{Equation 4}$$
$$(i_d - \hat{i}_d) \cdot |i_q|]$$
$$= (k_{p\omega} + k_{i\omega}/p)[\{(i_{s\alpha} - \hat{i}_{s\alpha})\hat{\phi}_{r\beta} - (i_{s\beta} - \hat{i}_{s\beta})\hat{\phi}_{r\alpha}\} +$$
$$k_\omega \cdot \text{sgn}(\omega_1^*) \cdot (i_d - \hat{i}_d) \cdot |i_q|]$$

In the equation 4 above, $k_\omega$ indicates the gain of the gain element 304, and x indicates an outer product.

The first term $(i_s - \hat{i}_s) \times \hat{\phi}_r$ in the brackets [ ] on the right side of the equation 4 is just the same also in the signal of the rotation coordinate system.

Therefore, the equation 4 can be transformed as shown in equation 5. The equation 5 is equivalent to the equation 4. Also in the equation 5, the absolute value $|\hat{i}_q|$ of the torque current estimated value can replace the absolute value $|i_q|$ of the torque current actual value.

$$\hat{\omega}_r = (k_{p\omega} + k_{i\omega}/p)[\{(i_d, i_q) - (\hat{i}_d, \hat{i}_q)\} \times (\hat{\phi}_{dr}, \hat{\phi}_{qr}) + \quad \text{Equation 5}$$
$$k_\omega \cdot \text{sgn}(\omega_1^*) \cdot (i_d - \hat{i}_d) \cdot |i_q|]$$
$$= (k_{p\omega} + k_{i\omega}/p)[\{(i_d - \hat{i}_d)\hat{\phi}_{qr} - (i_q - \hat{i}_q)\hat{\phi}_{dr}\} +$$
$$k_\omega \cdot \text{sgn}(\omega_1^*) \cdot (i_d - \hat{i}_d) \cdot |i_q|]$$

Thus, according to the present embodiment, the estimated speed 123 is amended in the direction such that the deviation between the magnetization current actual value and the estimated value can be suppressed depending on the level of the torque and the sign of the primary frequency command value although the voltage frequency applied to the motor is extremely low. Then, the current/flux estimation unit 110 estimates the flux using the amended estimated speed 123. Therefore, the flux vector of the motor can converge in a desired status, thereby matching the estimated speed with the actual speed.

The principle of the present invention can be applied not only to the induction motor in the above mentioned embodiment, but also to a synchronous motor.

As described above, according to the present invention, the flux and the speed can be stably estimated although the voltage frequency applied to an AC motor is extremely low. Therefore, the motor speed control range can be extended than in the conventional technology.

What is claimed is:

1. A speed sensorless vector control apparatus, comprising:
    a current/flux operation unit computing a primary current estimated value (hereinafter referred to as an estimated current) and a secondary flux estimated value (hereinafter referred to as an estimated flux) from a primary current, a primary voltage, and an estimated speed of an AC motor without a speed sensor;
    a coordinate conversion unit converting a primary current into a torque current and a magnetization current with an estimated flux vector set as a reference of a rotation coordinate;
    a current adjustment unit adjusting a torque current and a magnetization current such that the currents match respective commands;
    a coordinate conversion unit generating a primary voltage command by converting coordinates of an output signal of said current adjustment unit with an estimated flux vector set as a reference of a rotation coordinate;
    an inverter for driving the AC motor operated at a primary voltage command; and
    a speed estimation unit receiving an estimated current, an estimated flux, a primary current, a torque current, a magnetization current, and a primary frequency command value, and estimating speed of the motor, wherein
    said speed estimation unit adds a product of magnetization current deviation between an actual value of a magnetization current and an estimated value, a level of a torque current correspondence value, a sign correspondence value of a primary frequency command value, and a gain to an outer product of estimated current deviation between a primary current and an estimated current and an estimated flux, thereby estimating speed.

2. The apparatus according to claim 1, wherein said torque current correspondence value is a torque current estimated value.

3. The apparatus according to claim 1, wherein said torque current correspondence value is a torque current actual value.

4. A speed sensorless vector control apparatus, comprising:
    current/flux operation means for computing a primary current estimated value (hereinafter referred to as an estimated current) and a secondary flux estimated value (hereinafter referred to as an estimated flux) from a primary current, a primary voltage, and an estimated speed of an AC motor without a speed sensor;
    coordinate conversion means for converting a primary current into a torque current and a magnetization current with an estimated flux vector set as a reference of a rotation coordinate;
    current adjustment means for adjusting a torque current and a magnetization current such that the currents match respective commands;
    coordinate conversion means for generating a primary voltage command by converting coordinates of an output signal of said current adjustment means with an estimated flux vector set as a reference of a rotation coordinate;
    an inverter for driving the AC motor operated at a primary voltage command; and
    speed estimation means for receiving an estimated current, an estimated flux, a primary current, a torque current, a magnetization current, and a primary frequency command value, and estimating speed of the motor, wherein
    said speed estimation means adds a product of magnetization current deviation between an actual value of a magnetization current and an estimated value, a level of a torque current correspondence value, a sign correspondence value of a primary frequency command value, and a gain to an outer product of estimated current deviation between a primary current and an estimated current and an estimated flux, thereby estimating speed.

* * * * *